2 Sheets--Sheet 1.

A. H. KENNEDY.

Machines for Shearing Sheep.

No. 5,972. Reissued July 14, 1874.

WITNESSES

R. H. Morse.

H. H. Young

Albert H. Kennedy INVENTOR

By

W. D. Baldwin, his Attorney

THE GRAPHIC CO. PHOTO-LITH. 39 & 41 PARK PLACE, N.Y.

A. H. KENNEDY.

Machines for Shearing Sheep.

No. 5,972. Reissued July 14, 1874.

WITNESSES

R. H. Morse

H. H. Young

Albert H. Kennedy INVENTOR

By Wm. D. Baldwin, Jr. Attorney

THE GRAPHIC CO. PHOTO-LITH. 39 & 41 PARK PLACE, N.Y.

UNITED STATES PATENT OFFICE.

ALBERT H. KENNEDY, OF BENZONIA, MICHIGAN, ASSIGNOR, BY MESNE ASSIGNMENTS, TO SAMUEL S. WHITE, OF PHILADELPHIA, PA.

IMPROVEMENT IN MACHINES FOR SHEARING SHEEP.

Specification forming part of Letters Patent No. 59,293, dated January 30, 1866; reissue No. 2,615, dated May 14, 1867; reissue No. 5,477, dated July 1, 1873; reissue No. 5,972, dated July 14, 1874; application filed June 29, 1874.

*To all whom it may concern:*

Be it known that I, ALBERT H. KENNEDY, formerly of Brunswick, in the county of Medina and State of Ohio, but now residing at Benzonia, in the county of Benzie and State of Michigan, have invented certain new and useful Improvements in Machines for Shearing Sheep, of which the following is a specification:

The object of my invention is so to transmit power from a prime mover to sheep-shears that the latter may freely be moved in any direction to enable them to operate at any desired angle relative to the driving-shaft without disturbing its connection therewith, which end I attain by interposing between a rotating power-driven shaft, from which the power is conveyed to the shears itself, and a pair of sheep-shears free to move in any direction, a spiral spring or flexible shaft of coiled wire.

The subject-matter claimed is hereinafter designated.

Figure 1:
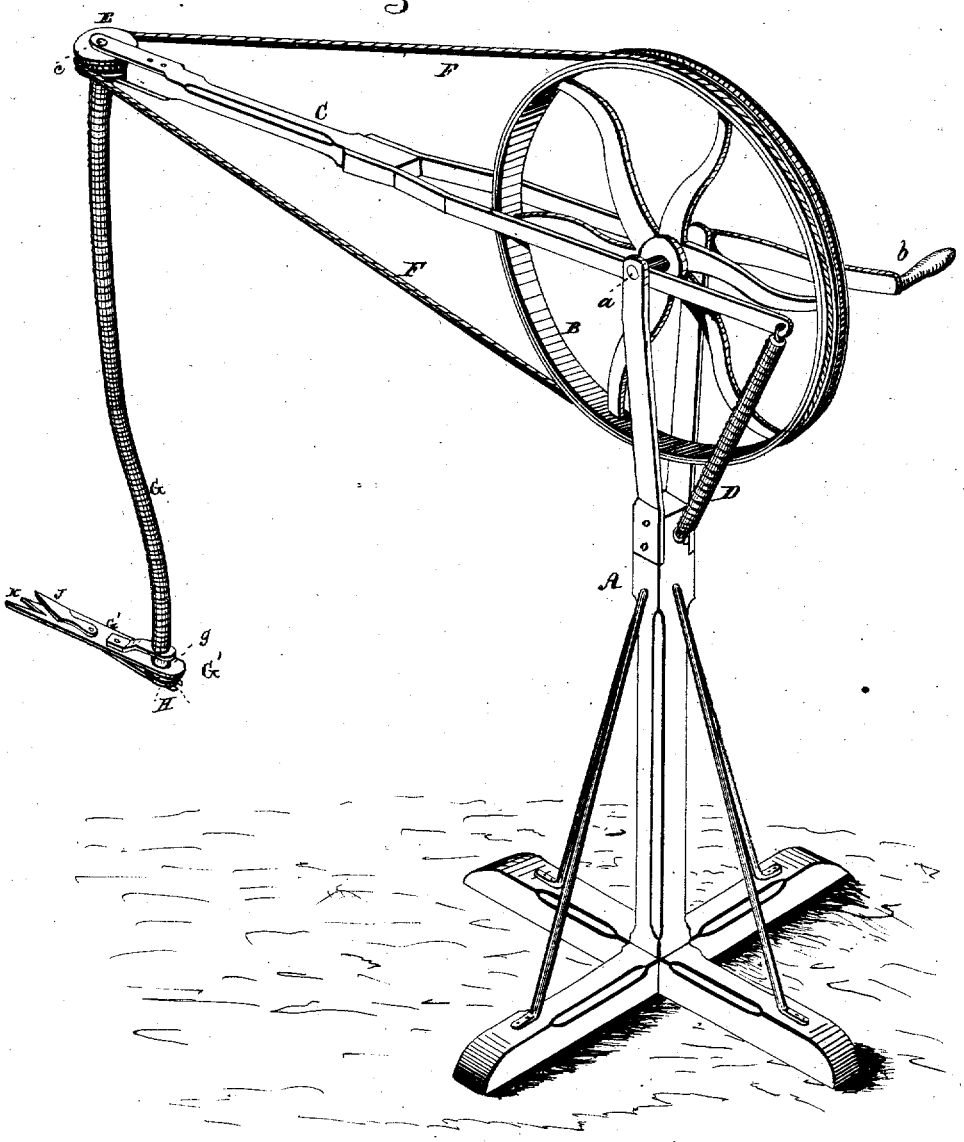
Figure 2:
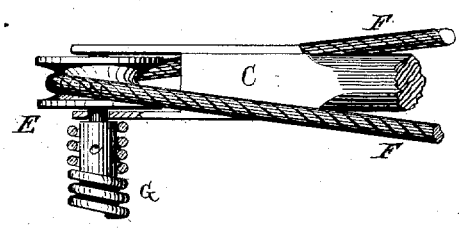
Figure 3:
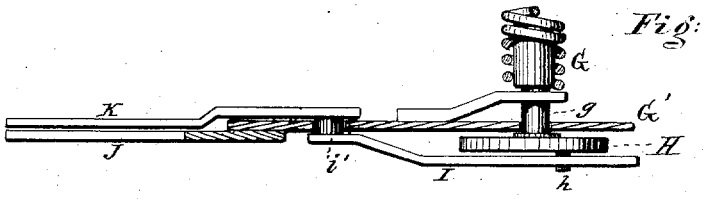
Figure 4:
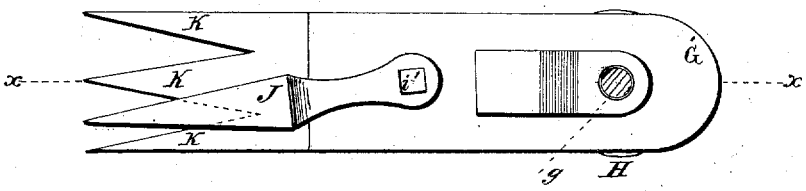
Figure 5:
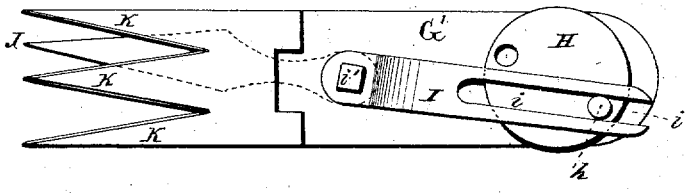

In the accompanying drawings, Figure 1 represents a view in perspective of so much of a sheep-shearing apparatus embodying my improvements as is necessary to illustrate the invention herein claimed. Fig. 2 is a detail view, partly in section, showing the connection between the flexible shaft and its driving mechanism. Fig. 3 represents a vertical longitudinal central section through the shears on the line *x x* of Fig. 4, showing the connection between the flexible shaft and the shears operated by it. Fig. 4 represents a top-plan view of the shears, and Fig. 5 a bottom plan thereof.

A band-wheel, B, driven by a crank, *b*, or in any other equally well-known way, is mounted on a shaft, *a*, in bearings supported in a frame or stand, A. An endless band or belt, F, passes from the band-wheel B around a pulley, E, mounted in bearings in an arm, C, pivoted upon the shaft *a* of the band-wheel. One end of a spiral spring, G, of steel, copper, or other metal most suitable for the purpose, is connected with the shaft or journal *c* of the pulley E. To the other end of this spring is attached a stub, *g*. This stub *g* turns in bearings in a band-piece or casing, G, and has a crank-wheel, H, mounted upon it. A crank-pin, *h*, on this wheel, works in the slot *i* of a tail-piece or rocking lever, I, which is oscillated on a pivot, *i'*, by the rotation of the crank-pin. A vibrating cutter, J, is secured on this pivot, and is caused, by its oscillation, to shear over a series of fixed guards or knives, K, on the casing.

By the method of construction above described, the operator is enabled to move the instrument in all directions with the greatest facility.

I do not broadly claim transmitting motion through a jointed or flexible shaft, such method of transmission being well known in the arts. Neither do I broadly claim herein the combination of the driving mechanism and flexible shaft with any instrument other than the sheep-shears, as this feature forms the subject-matter of another division of my original patent, and is numbered reissue No. 5,476, dated July 1, 1873.

I claim herein as of my own invention—

The combination of sheep-shears, mechanism for operating them mounted on the frame, casing or handle of the shears, and a power-driven coiled-wire shaft by which the shears are suspended, these members being constructed and operating substantially in the manner set forth.

ALBERT H. KENNEDY.

Witnesses:

EMILY S. BAILEY,
W. H. MACK.